United States Patent [19]

Leben

[11] Patent Number: 5,006,038
[45] Date of Patent: Apr. 9, 1991

[54] METHOD FOR CARRYING AND TRANSPORTING COMPUTER TAPE CARTRIDGES

[76] Inventor: David G. Leben, 105 S. Broadway, Ste. 640, Wichita, Kans. 67202

[21] Appl. No.: 392,210

[22] Filed: Aug. 10, 1989

Related U.S. Application Data

[62] Division of Ser. No. 287,739, Dec. 21, 1988, Pat. No. 4,874,088.

[51] Int. Cl.$^5$ .............................................. B65D 25/18
[52] U.S. Cl. ...................................... 414/786; 206/511
[58] Field of Search ................. 414/788.2, 795.6, 786; 206/315.11, 387, 508, 509, 503, 510, 511, 506; 220/469, 306

[56] References Cited

U.S. PATENT DOCUMENTS

| | | | |
|---|---|---|---|
| 3,713,529 | 1/1973 | Meksola | 206/315.11 X |
| 3,730,576 | 5/1973 | Schurman | 220/334 X |
| 4,703,853 | 11/1987 | Byrns | 206/387 |
| 4,796,755 | 1/1989 | Ardenti | 206/387 X |
| 4,819,795 | 4/1989 | Swaney | 206/508 X |

Primary Examiner—Frank E. Werner
Assistant Examiner—James T. Eller, Jr.
Attorney, Agent, or Firm—John Wade Carpenter

[57] ABSTRACT

A method for carrying and transporting computer tape cartridges comprising a container top pivotally secured to a container base. Both the top and the base are provided with hollow walls and ends. Both the base and the top are further provided with ribs and ridges which hold computer tape cartridges stationary while the container is being carried and/or transported.

5 Claims, 6 Drawing Sheets

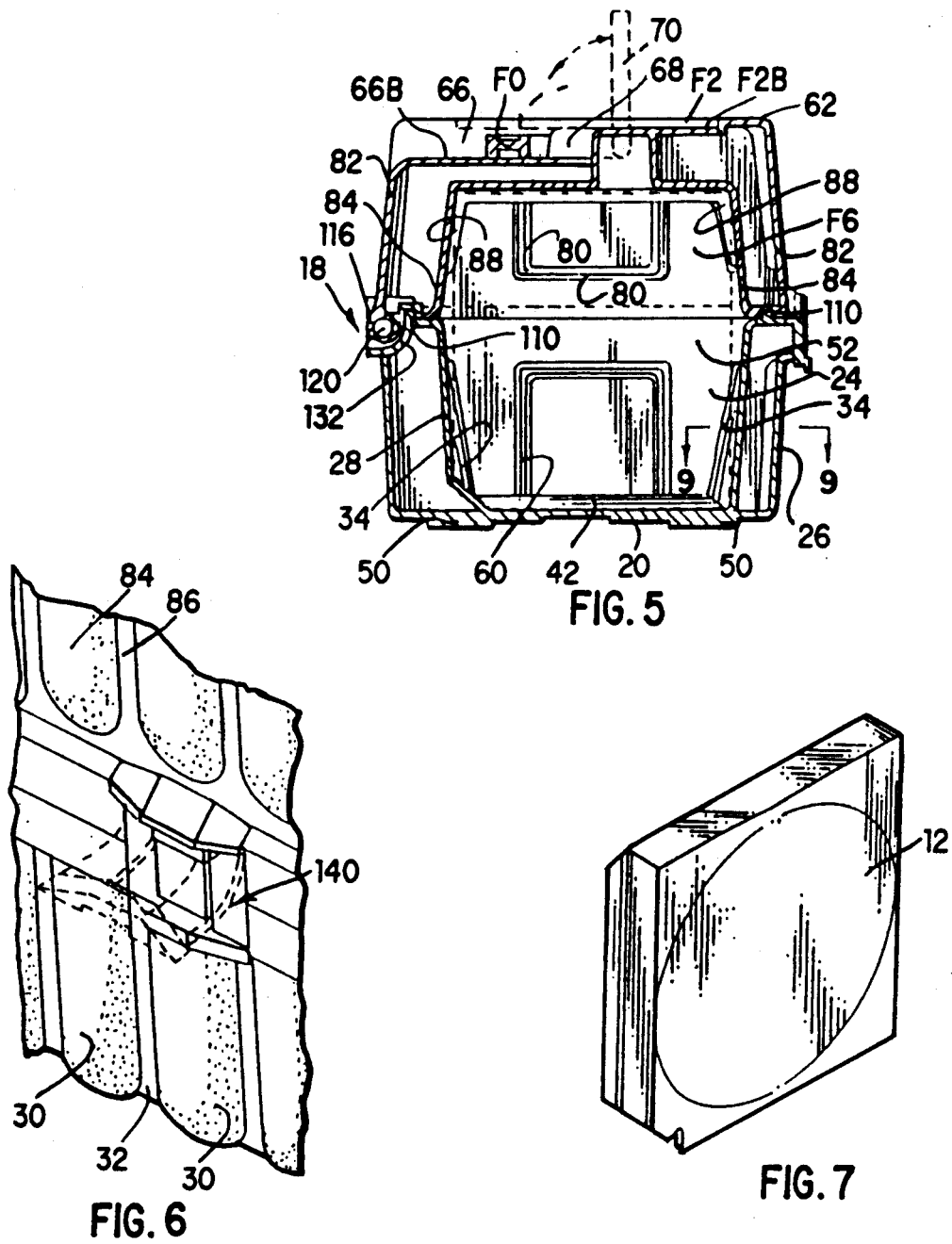
FIG. 5
FIG. 6
FIG. 7
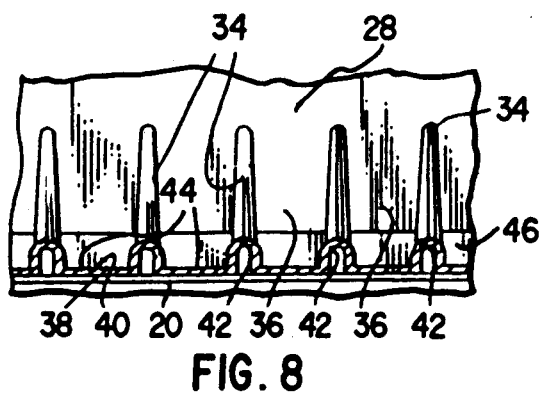
FIG. 8

METHOD FOR CARRYING AND TRANSPORTING COMPUTER TAPE CARTRIDGES

This is a division application of application Ser. No. 07/287,739 filed Dec. 21, 1988 now U.S. Pat. No. 4,874,088.

FIELD OF THE INVENTION

This invention is related to a container. More specifically, this invention provides for an apparatus and container for carrying and transporting computer tape cartridges and the like.

DESCRIPTION OF THE PRIOR ART

A patentability investigation was conducted and the following U.S. patents were discovered: U.S. Pat. No. 3,902,628 to Schurman and No. 3,730,576 to Schurman. Neither of the foregoing prior art patents teach or suggest the particular apparatus and method for carrying and transporting computer tape cartridges of this invention.

SUMMARY OF THE INVENTION

The present invention accomplishes its desired objects by broadly providing a container for carrying and transporting computer tape cartridges and the like. The container includes a container base having a base bottom, a pair of hollow upright side walls integrally secured to the base bottom, and a pair of base end walls integrally secured to the base bottom and to the base side walls. Each of the base hollow upright side walls has a base outside wall and a base inside wall with the base outside wall having a structure defining a plurality of hollow dome-shaped protrusions spaced by an abridging outside wall member. The base inside wall has a structure defining a plurality of hollow dome-shaped ribs spaced by an abridging inside wall member. The base bottom has a base outside wall, and a base inside wall with a structure having a plurality of hollow dome-shaped ridges spaced by an abridging base inside wall member. The dome-shaped ribs integrally connect to the dome-shaped ridges. The container further comprises a container lid pivotally secured to the container base. The container lid has a structure with a handle recess.

The present invention further accomplishes its desired objects by also broadly providing a method for stacking containers in a superimposed posture to facilitate the carrying and transporting of the containers comprising the steps of (a) forming two containers wherein each container comprises a container base pivotally secured to a container top with the container top having a structure defining a handle recess with a handle recess depth and a top recess with a top recess depth, and the container base includes a plurality of protruding legs bound to a bottom thereof;

(b) securing pivotally a handle to the container within the handle recess of each of the containers, wherein each of the handles has a thickness less than the depth of each of the handle recesses;

(c) pivoting the handle of one of the containers downwardly to lie flushed against the bottom of the handle recess such as to completely contain the handle therein with no structural part of the handle extending above the handle recess; and (d) positioning the protruding legs of the other container into the top recess such that the protruding legs prevent the other container from readily sliding away from the container having the top recess that receives the protruding legs of the other container.

It is therefore an object of the present invention to provide a container for carrying and transporting computer tape cartridges.

It is another object to provide a method for stacking containers.

These, together with the various ancillary objects and features which will become apparent to those skilled in the art as the following description proceeds, are attained by this novel container and method, a preferred embodiment being shown with reference to the accompanying drawings, by way of example only, wherein:

BRIEF DESCRIPTION OF THE DRAWINGS

FIG. 5 is a vertical sectional view taken in direction of the arrows and along the plane of line 5—5 in FIG. 2;

FIG. 6 is a partial perspective view of one embodiment of the hinge for the container of this invention;

FIG. 7 is a perspective view of a typical computer tape cartridge to be carried and transported by the container of this invention;

FIG. 8 is a vertical sectional view taken in direction of the arrows and along the plane of line 8—8 in FIG. 4;

DETAILED DESCRIPTION OF THE INVENTION

Figure 4:
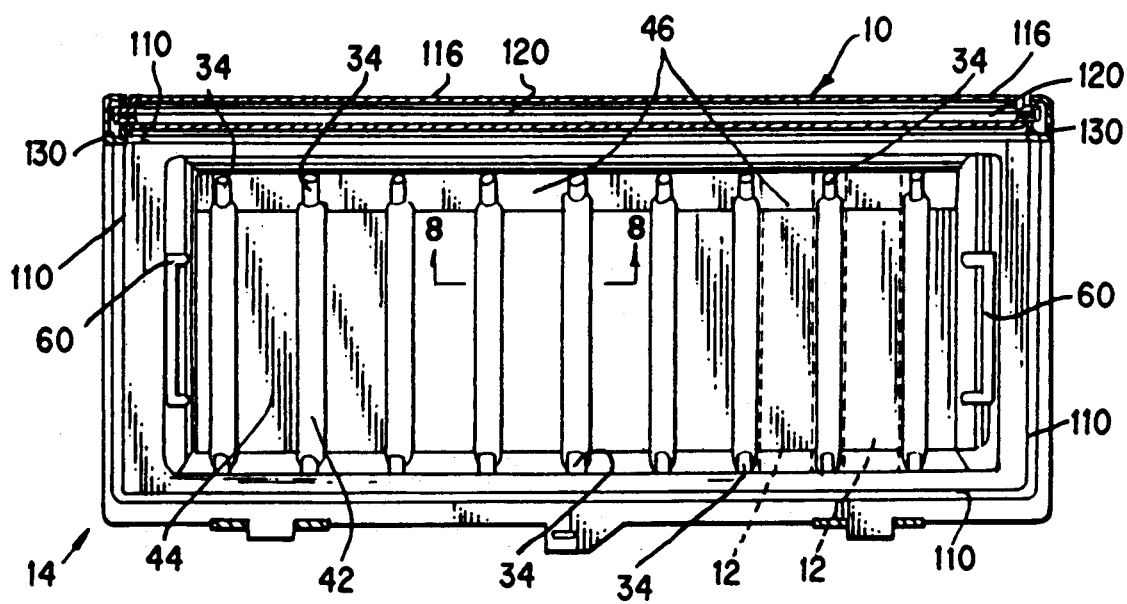
FIG. 4 is a horizontal sectional view taken in direction of the arrows and along the plane of line 4—4 in FIG. 1.
Figure 17:
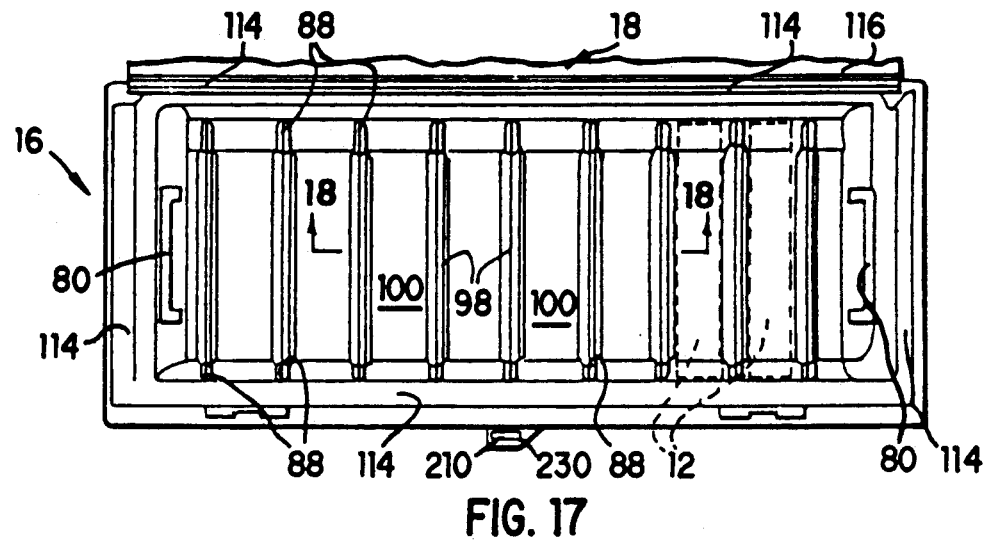
FIG. 17 is a top plan view of the container top for the container.

Referring in detail now to the drawings wherein similar parts of the invention are identified by like reference numerals, there is seen a container, generally illustrated as 10, for carrying and transporting computer tape cartridges 12 and the like. The container 10 has a container base 14 (see FIG. 4) pivotally secured to a container top 16 (see FIG. 17) along a hinge structure, generally illustrated as 18.

Figure 9:
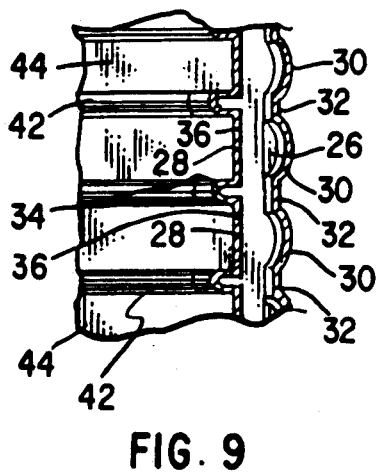
FIG. 9 is a partial horizontal sectional view taken in direction of the arrows and along the plane of line 9—9 in FIG. 5.
Figure 10:
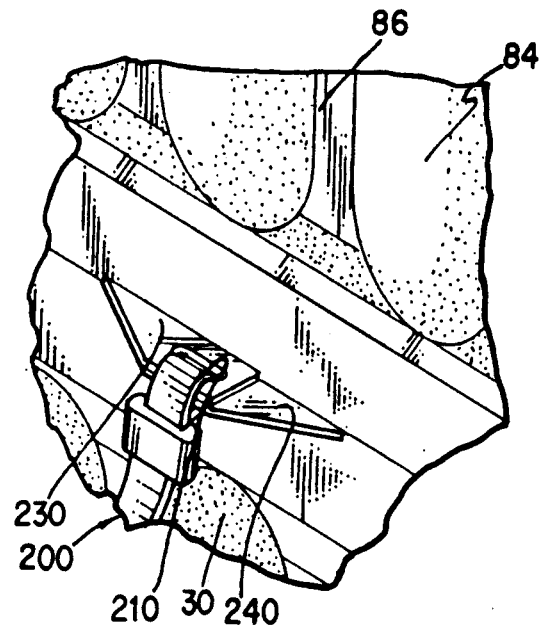
FIG. 10 is a partial perspective view of a strap means engaging the container of this invention shut.

The container base 14 has a bottom 20, a pair of hollow upright side walls 22—22 bound to the bottom 20, and a pair of hollow end walls 24—24 connecting to the bottom 20 and to the side walls 22—22. Each of the side walls 22—22 is made up of or comprises or is formed with an outside wall 26 and an inside wall 28. The outside wall 26 as best shown in FIG. 9 is formed with a plurality of hollow dome-shaped protrusion 30 spaced by an abridging wall member 32. As further best shown in FIG. 9 and in FIG. 8, the inside wall 28 is formed to have a plurality of dome-shaped ribs 34 spaced or separated by an abridging wall member 36. Each dome-shaped protrusion 30 is directly opposed to an abridging wall member 36. Similarly, each dome-shaped rib 34 is directly opposed to an abridging wall member 32. The bottom 20 of the container base 14 has an outside wall 38 and an inside wall 40 (see FIG. 8). The inside wall 40 is formed with a plurality of hollow dome-shaped ridges 42 separated by a base floor 44 (see FIGS. 8 and 9). The ridges 42 on the inside wall 40 of bottom 20 integrally connect or join with the dome-shaped ribs 34. A sloping corner structure 46 separates the abridging wall member 36 from the base floor 44 on one side of the container base 14 or between one of the inside walls 28 of the side walls 22—22 and the inside wall 40 of the bottom 20. Integrally bound to the outside wall 38 of the bottom 20 is a plurality of protruding legs or feet 50, preferably four protruding feet 50. Each foot 50 has a given length, typically 1/16 inch to ¼ inch.

Figure 1:
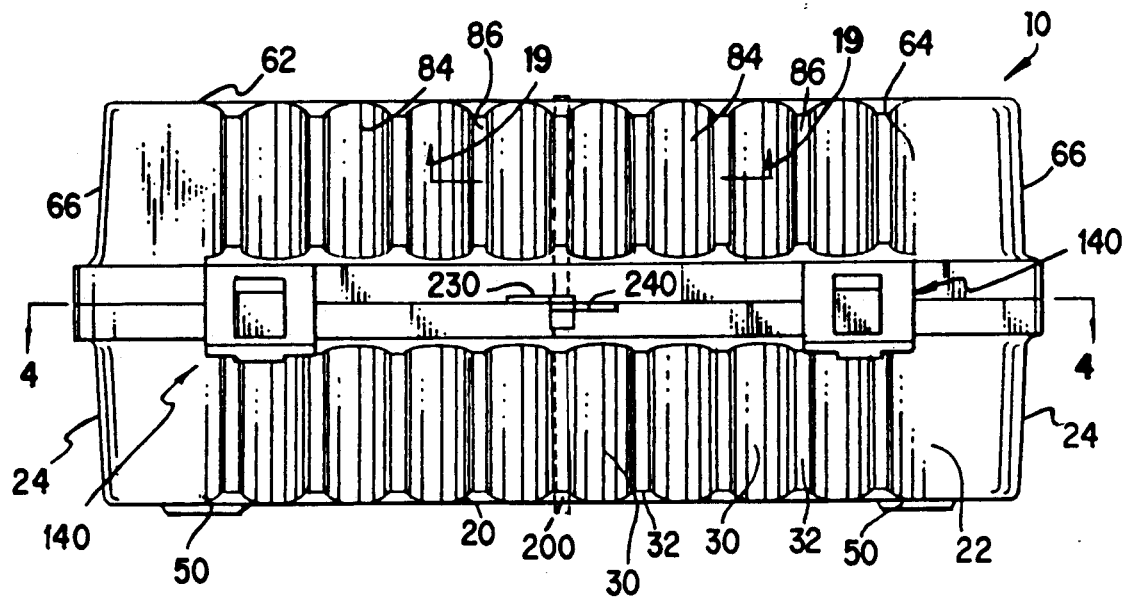
FIG. 1 is a front elevational view of the container of this invention.
Figure 2:
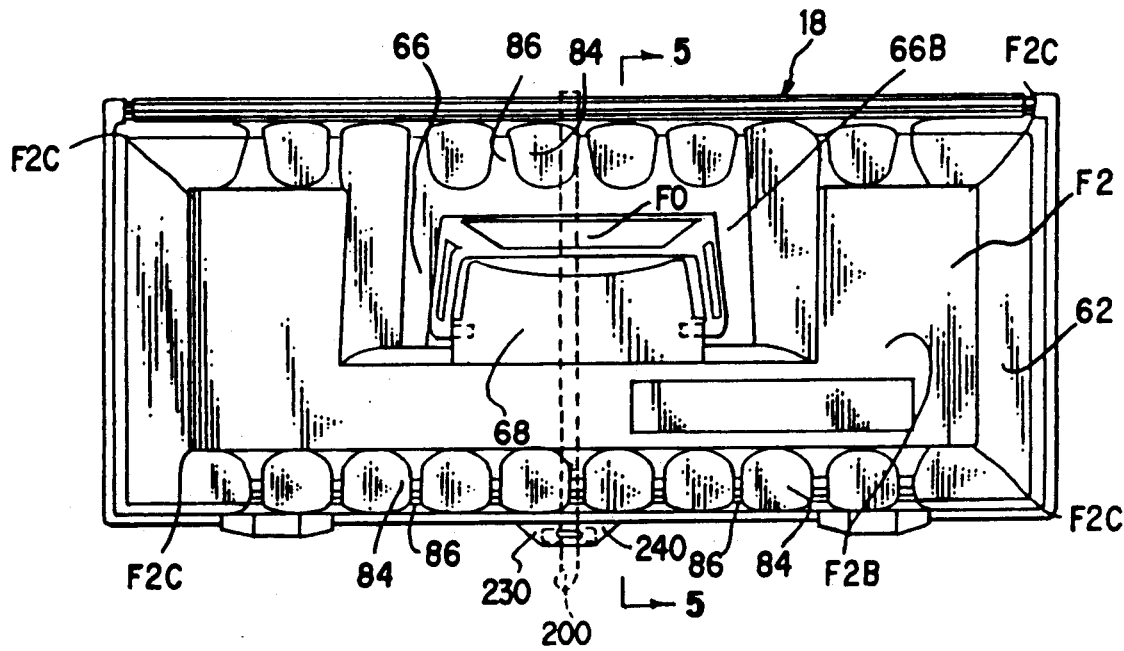
FIG. 2 is a top plan view of the container of FIG. 1.
Figure 3:
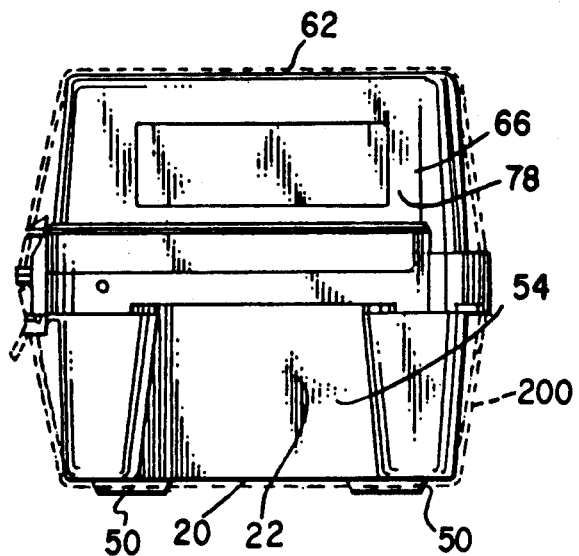
FIG. 3 is an end elevational view of the container of FIGS. 1 and 2.
Figure 12:
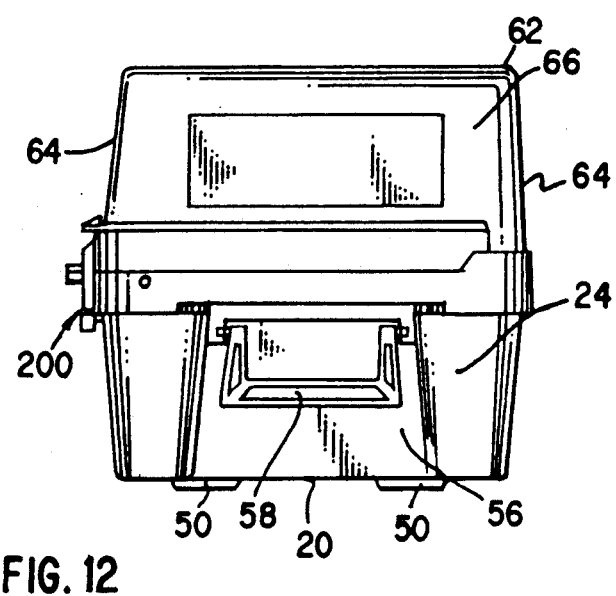
FIG. 12 is an end elevational view of another embodiment of the container of this invention having a handle pivotally secured to the base bottom thereof.
Figure 13:
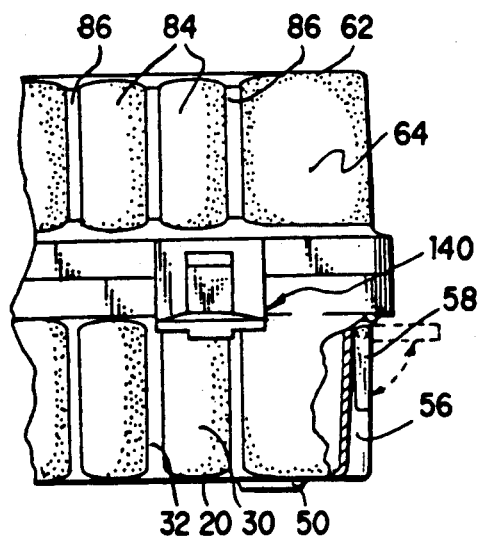
FIG. 13 is a partial side elevational view of the container of FIG. 12 disclosing the handle pivotally secured to the base bottom.
Figure 14:
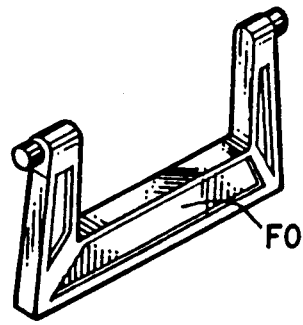
FIG. 14 is a perspective view of either a top handle or a side handle.

Each of the hollow end walls 24 comprises an inside end wall 52 and an outside end wall 54 (see FIGS. 3 and 5). In a preferred embodiment of the invention, each of the outside end wall 54 has a recess 56 (see FIGS. 12 and 13) wherein a handle 58 lodges while being pivotally engaged to the outside end wall 54. Each of the inside end walls 52 is formed with a U-shaped rib 60 that protrudes outwardly therefrom.

Figure 15:
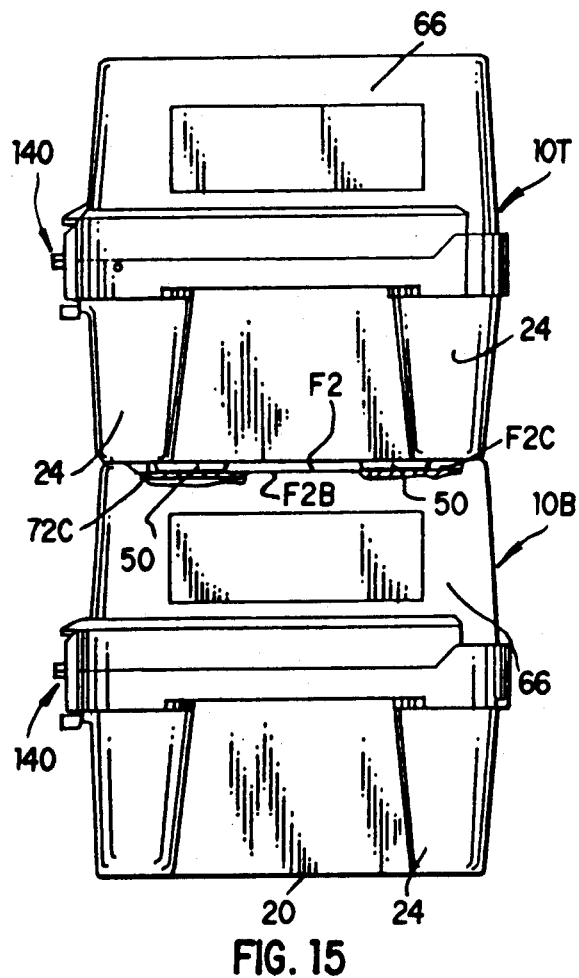
FIG. 15 is an end elevational view showing a pair of containers in a stacked position.

The container top 16 has a top 62, a pair of top hollow side walls 64—64 connected to the top 62, and a pair of hollow end walls 66—66 secured to the top 62 and to the side walls 64—64. The top 62 is formed to have a rectangular handle recess 66 having a recess bottom 66B and with a platform 68 protruding thereinto. Pivotally secured to the platform 68 and lodging pivotally in the handle recess 66 is a handle 70. The handle recess 66 has a defined handle recess depth that is longer, deeper or greater than the thickness of the handle 70 such that when the handle 70 is pivoted downwardly to lie flushed against the recess bottom 66B, the handle 70 is completely contained within the recess 66 with no structural part of the handle 70 extending above the handle recess 66 as illustrated in FIG. 5. Generally bordering three sides of the handle recess 66 and in close proximity thereto is a generally U-shaped top recess 72 having a top recess bottom 72B and recess corners 72C. Recess 72 has a depth that is slightly longer, deeper or greater than protruding feet 50 such that when handle 70 of a bottom container 10B (see FIG. 15) is pivoted flushly against recess bottom 66B the protruding legs or feet 50 of a top container 10T readily lodges within the U-shaped recess 72 of the bottom container 10B and flushed against and within the recess corners 72C of the bottom container 10B. With the protruding legs or feet 50 of the top container 10T disposed as such the top container 10T and the bottom container 10B can not readily slide away from each other, and the containers 10T and 10B are stacked in a superimposed posture to facilitate the carrying and transporting of the containers 10T and 10B. Obviously, three or more containers 10 may be stacked accordingly.

Each of the hollow end walls 66—66 has a top inside wall 76 (see FIG. 5) and a top outside wall 78 (see FIG. 3). The inside wall 76 is formed with a U-shaped rib member 80 that protrudes outwardly therefrom. Each of the hollow side walls 66 is made up or formed with a top outside wall 82 and a top inside wall 84. The top outside wall 82 as best shown in FIG. 19 is formed with a plurality of hollow dome-shaped protrusions 84 spaced or separated by abridging wall member 86. As further best shown in FIGS. 18 and 19, the top inside wall 84 is formed to have a plurality of dome-shaped ribs 88 spaced or separated by abridging wall member 90. Each dome-shaped protrusion 84 is directly opposed to an abridging wall member 90. Similarly, each dome-shaped rib 88 is directly opposed to an abridging wall member 86.

Figure 18:
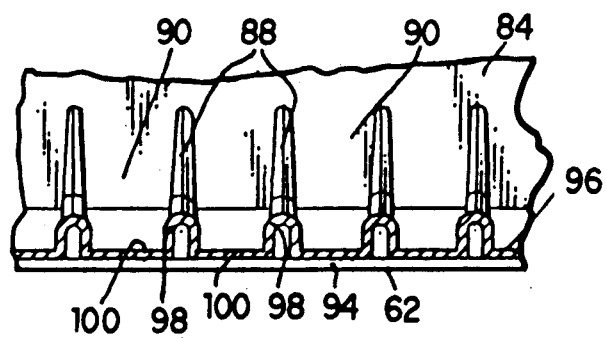
FIG. 18 is a partial vertical sectional view taken in direction of the arrows and along the plane of line 18—18 in FIG. 17.
Figure 19:
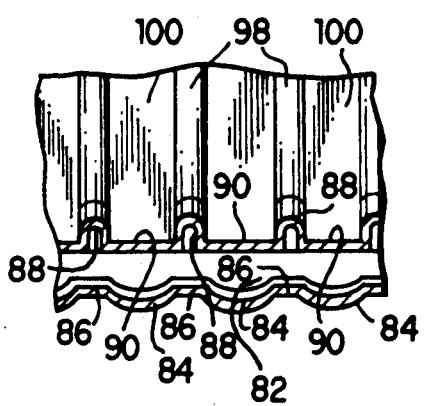
FIG. 19 is a partial horizontal sectional view taken in direction of the arrows and along the plane of line 19—19 in FIG. 1.

The top 62 has a top outside wall 94 and a top inside wall 96 (see FIG. 18). The top inside wall 96 is formed with a plurality of hollow dome-shaped ridges 98 separated by a top floor 100 (see FIGS. 18 and 19). The ridges 98 on the inside wall 96 of the top 62 integrally connect or join with the dome-shaped ribs 88. When a computer tape cartridge 12 is disposed or lodged between any pair of contiguous ridges 42 and on a base floor 44 and between the corresponding pair of aligned ribs 34—34 (see dotted lines in FIG. 4), and the container top is pivotally closed, the top of the computer tape cartridge 12 lodges between a pair of contiguous ridges 98 and is flushed on the top floor and between the corresponding pair of aligned ribs 88—88 (see dotted lines in FIG. 17) on the inside of the container top 16. Thus, ridges 42 and base floor 44 and ribs 34—34 on the inside of the container base 14 are respectively aligned with the ridges 98 and top floor 100 and ribs 88 on the inside of the container top 16, all for the purpose of holding the computer tape cartridges 12 fixed or stationary while being carried and transported in container 10.

When container top 16 is pivotally shut or closed against the container base 14, a tight fit is developed. Such a tight fit results from a perimetrical base ridge 110 (see FIGS. 4 and 5), which traverses the top of the side walls 22—22 and the top of the end walls 24—24, removably lodging into a perimetrical recess 114 (see FIG. 17) which traverses the bottom of the top side walls 64—64 and the bottom of the end walls 66—66. Part of the perimetrical recess 114 on the bottom of one of the side walls 64 is bordered by a conduit sleeve 116 (see FIGS. 5 and 17) which is integrally formed on the bottom of said one of the side walls 64 and is part of the hinge structure 18. The remaining part of the hinge structure 18 is made up of a rod 120 (see FIGS. 4 and 5) rotatably disposed on its ends in a pair of recesses 130—130 (see FIG. 4) formed on top and at an end of one of the side walls 22 and rotatably disposed through the sleeve 116. As best illustrated in FIG. 5, said one of the side walls 22 has an arcuate ridge 132 on the top thereof to accommodate the position of the sleeve 116.

Figure 11:
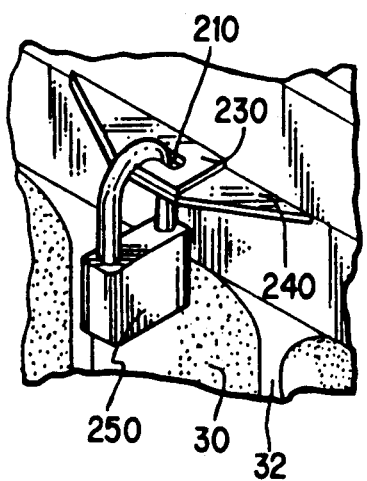
FIG. 11 is a partial perspective view of a lock which engages the container of this invention in a shut position.
Figure 16:
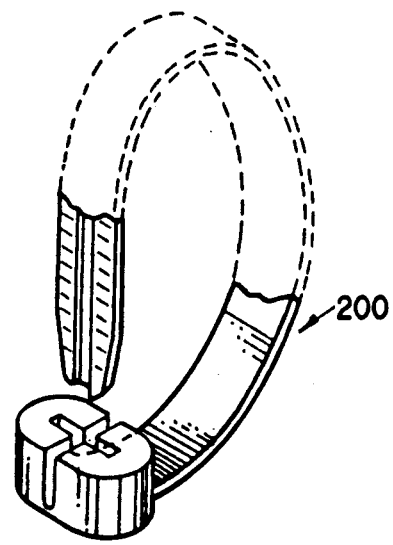
FIG. 16 is a partial perspective view of a strap used to lock and encircle the container.

The container 10 of this invention is preferably formed with hinges 140 that are best described in U.S. Pat. No. 3,730,576, fully incorporated herein by reference thereto. Hinges 140 may also take the form of hinges described in U.S. Pat. No. 3,902,628 which is also fully incorporated herein by reference thereto. The container 10 of this invention may be provided with a strap means 200 (see FIGS. 16 and 3) which may pass through eyelets 210 and 220 of legs 230 and 240 respectively bound to the bottom of one of the top side walls 64 and the top of one of the upright side walls 22. A lock 250 (see FIG. 11) may also be provided with container 10 for passing through eyelets 210 and 220 to lock shut the container 10.

The container 10 of this invention, including all of its parts, may be manufactured from any suitable thermoplastic material, such as high density polyethylene, polypropylene, polyvinyl, and elastomeric polyolefin, which are given by way of example only. Preferably, the container 10 of this invention is made from a high density polyethylene to allow maximum "shock" protection if the container 10 is dropped. Air space is created in its double shell (i.e., dual walls and ends for both the container top 16 and the container base 14) construction to cushion cartridges 12 from damaging blows. The handle 70 (including handle 58) will fold down into the previously mentioned recessed areas when not in use. The hinge structure 18 is formed such that the container top 16 and the container base 14 can be opened into a 180 degree position to provide stability in such opening position. The container base 14 and the container top 16 are approximately the same height such that the 180 degree opened posture is indeed stable, preventing the sure-footed container 10 of this invention from rocking.

The container 10 of this invention is very stackable. The rectangular shaped stacking feature of FIG. 15 prevents the containers 10—10 from sliding when placed one on top of another. As previously indicated, the protruding feet 50 on the bottom 20 of the container base 14 and the U-shaped recess 72 in the container top 62 are formed such that the container base 14 of one container can be locked against the container top 16 of a lower container, providing excellent stackability in carrying and transporting containers 10.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A method for stacking containers in a superimposed posture to facilitate the carrying and transporting of the containers comprising the steps of:

(a) forming a first container for carrying and transporting computer tape cartridges and comprising a first container base having a base bottom, a pair of base hollow upright side walls integrally secured to said base bottom, and a pair of base end walls integrally secured to said base bottom and to said base side walls, each of said base hollow upright side walls having a base outside wall and a base inside wall with said base outside wall having a structure defining a plurality of hollow dome-shaped protrusions spaced by an abridging outside wall member and with said base inside wall having a structure defining a plurality of hollow dome-shaped ribs spaced by an abridging inside wall member, and said base bottom having a base outside wall with a plurality of first protruding legs bound thereto and a base inside wall having a structure defining a plurality of hollow dome-shaped ridges spaced by an abridging base inside wall member, said dome-shaped ribs integrally connected to said dome-shaped ridges; and a first container lid pivotally secured to said first container base, said first container lid having a structure defining a first handle recess with a first handle recess depth and a first top recess with a first top recess depth;

(b) forming a second container comprising a second container base pivotally secured to a second container lid with the second container lid having a structure defining a second handle recess with a second handle recess depth and a second top recess with a second top recess depth, and said second container base includes a plurality of second protruding legs bound to a bottom thereof;

(c) securing pivotally a second handle to said second container lid within said second handle recess of said second container lid, said second handle has a thickness less than the depth of said second handle recess depth;

(d) pivoting said second handle downwardly to be flushed against the bottom of said second handle recess such as to completely contain said second handle therein with no structural part of said second handle extending above said second handle recess;

(e) positioning the first protruding legs of the first container into said second top recess such that the first protruding legs prevent the first container from readily sliding away from the second container.

2. The method of claim 1 additionally comprising forming said first container lid to contain a handle platform protruding into said first handle recess.

3. The method of claim 2 additionally comprising securing pivotally a first handle to said handle platform.

4. The method of claim 1 additionally comprising disposing a computer tape cartridge into said first container base.

5. The method of claim 2 additionally comprising disposing a tape cartridge into said second container base.

* * * * *